United States Patent
Neutsch (10) Patent No.: US 12,233,826 B2
(45) Date of Patent: Feb. 25, 2025

(54) HYDRAULIC FITTING

(71) Applicant: RIVA GMBH ENGINEERING, Backnang (DE)

(72) Inventor: Christian Neutsch, Stralsund (DE)

(73) Assignee: RIVA GmbH Engineering, Backnang (DE)

( * ) Notice: Subject to any disclaimer, the term of this patent is extended or adjusted under 35 U.S.C. 154(b) by 0 days.

(21) Appl. No.: 18/705,248

(22) PCT Filed: Oct. 19, 2022

(86) PCT No.: PCT/EP2022/079036
§ 371 (c)(1),
(2) Date: Apr. 26, 2024

(87) PCT Pub. No.: WO2023/072695
PCT Pub. Date: May 4, 2023

(65) Prior Publication Data
US 2024/0326765 A1    Oct. 3, 2024

(30) Foreign Application Priority Data
Oct. 28, 2021   (DE) .................... 10 2021 128 118.0

(51) Int. Cl.
*B60T 11/22*     (2006.01)
*B60T 7/10*      (2006.01)
(Continued)

(52) U.S. Cl.
CPC .............. *B60T 11/22* (2013.01); *B60T 7/102* (2013.01); *B60T 11/30* (2013.01); *B60T 17/222* (2013.01)

(58) Field of Classification Search
CPC ........ B60T 11/22; B60T 11/30; B60T 17/222; F15B 21/044
See application file for complete search history.

(56) References Cited

U.S. PATENT DOCUMENTS 4,971,402 A * 11/1990 Chen ................... B60T 8/32
                                                303/68
6,928,815 B2 * 8/2005 Ishida .............. F16J 15/3268
                                                92/169.1
(Continued)

FOREIGN PATENT DOCUMENTS

DE    202005018463 U1    1/2006
DE    202006020544 U1    11/2008
(Continued)

OTHER PUBLICATIONS

PCT International Search Report and Written Opinion for International Application No. PCT/EP2022/079036 filed Oct. 19, 2022, Date of Mailing: Feb. 10, 2023, 12 pgs.
(Continued)

*Primary Examiner* — Thomas E Lazo
(74) *Attorney, Agent, or Firm* — Alix, Yale & Ristas, LLP (57) ABSTRACT

A hydraulic fitting (10) for a hydraulic transmitter system (100) having a housing (12) in which a fluid reservoir (16), a pressure chamber (20) which is fluidically connected to the fluid reservoir (16) and a venting bore (22, 22') which connects the pressure chamber (20) to a housing surroundings are configured, wherein the venting bore (22, 22') can be closed in a closed position (III) during operation and can be opened to produce a venting position (V), also having an additional fluid connection between the fluid reservoir (16) and the pressure chamber (20) which is interrupted during operation but which can be temporarily opened to permit rapid venting in a rapid venting position (IV) while the venting bore (22) remains closed.

10 Claims, 5 Drawing Sheets

(51) Int. Cl.
  *B60T 11/30* (2006.01)
  *B60T 17/22* (2006.01)

(56) References Cited

U.S. PATENT DOCUMENTS

| | | | |
|---|---|---|---|
| 7,412,829 B2* | 8/2008 | Matsushita | B62L 3/023 60/592 |
| 8,991,171 B2* | 3/2015 | Bernadat | F16J 15/3236 60/588 |
| 9,156,522 B2 | 10/2015 | Dunlap et al. | |
| 2003/0159440 A1* | 8/2003 | Lavezzi | F15B 21/044 60/584 |
| 2005/0247057 A1* | 11/2005 | Lavezzi | F15B 21/044 60/533 |
| 2007/0131503 A1 | 6/2007 | Matsushita et al. | |
| 2012/0161420 A1 | 6/2012 | Eberlein et al. | |
| 2018/0274562 A1 | 9/2018 | Chambers | |

FOREIGN PATENT DOCUMENTS

| | | |
|---|---|---|
| DE | 102018002519 A1 | 9/2018 |
| EP | 1795419 A2 | 6/2007 |
| EP | 1798126 A2 | 6/2007 |
| EP | 1795419 B1 | 9/2010 |
| EP | 2484569 A1 | 8/2012 |
| TW | 1307667 B | 3/2009 |

OTHER PUBLICATIONS

PCT International Preliminary Report on Patentability for International Application No. PCT/EP2022/079036 filed Oct. 19, 2022, Date of Mailing: May 10, 2024, Date of issuance: Apr. 30, 2024, 9 pgs.

* cited by examiner

HYDRAULIC FITTING

TECHNICAL FIELD

The present disclosure relates to a hydraulic fitting and, in particular, a hydraulic fitting for open or closed hydraulic systems as are used, in particular, in handlebar-steered vehicles such as bicycles, motorcycles, and the like, in combination with, for example, brake or clutch systems.

DESCRIPTION OF THE PRIOR ART

Hydraulic fittings of the type in question for hydraulic systems and, in particular, for hydraulic brake systems are known from the prior art and typically comprise a housing in which a cylinder bore is configured with a piston which is guided therein. A hydraulic fluid is located in the cylinder bore, the hydraulic fluid being supplied under pressure to a connected hydraulic line by actuating the piston. The cylinder bore is generally fluidically connected to a fluid reservoir, which is also configured in the housing, in order to be supplied with further fluid therefrom if required (for example in the case of increasing wear of the brake pads). For removing air which has undesirably penetrated into the hydraulic system, generally venting openings are provided. Additionally, different approaches are known from the prior art for counteracting the penetration of undesired air. A hydraulic fitting of the type in question without a fluid reservoir is disclosed, for example, in EP 2 484 569 A1.

SUMMARY OF THE DISCLOSURE

The central idea of the disclosed hydraulic fitting is based on providing an additional option for rapid venting. This is achieved by a further fluid connection between a pressure chamber of the hydraulic fitting and the fluid reservoir thereof, the fluid connection being interrupted during operation and being able to be temporarily opened up in a rapid venting position.

The fluid connection can be provided by a connecting passage between the pressure chamber and the fluid reservoir. A closure element is provided for the closure. The closure element is able to be actuated, in particular, from outside, for example between at least one first position closing the connecting passage during operation and a second position opening up the connecting passage for rapid venting. The closure element can be a latching pin which is adjustable between at least two positions, an adjustable screw, or the like.

The connecting passage can be arranged such that the function of the closure element is undertaken by an otherwise present closure member for closing a venting bore provided for the purposes of venting. This variant can be used both when the fluid reservoir and the pressure chamber are directly connected by the connecting passage and also in an indirect connection, for example via the venting bore in which the connecting passage feeds into the venting bore from the fluid reservoir. The closure member of the venting bore is thus accordingly adjustable between a closed position in which the venting bore and the connecting passage are closed, an intermediate position in which the connecting passage is opened up, without the venting bore being connected to the housing surroundings, and an open position which produces a connection between the pressure chamber and the housing surroundings. The closure member can be, for example, a screw plug.

Further advantages and embodiments of the disclosed hydraulic fitting are found in the dependent claims, the description and the accompanying drawings.

It goes without saying that the aforementioned features, which are to be explained in more detail below, are not only able to be used in the respectively specified combination but also in other combinations or individually without departing from the scope of the present invention.

The disclosed hydraulic fitting is shown schematically in the drawing with reference to an exemplary embodiment and is described in detail hereinafter with reference to the drawings.

DETAILED DESCRIPTION

Features which are the same and similar and which are shown in the individual figures are denoted by the same reference signs.

Figure 1:
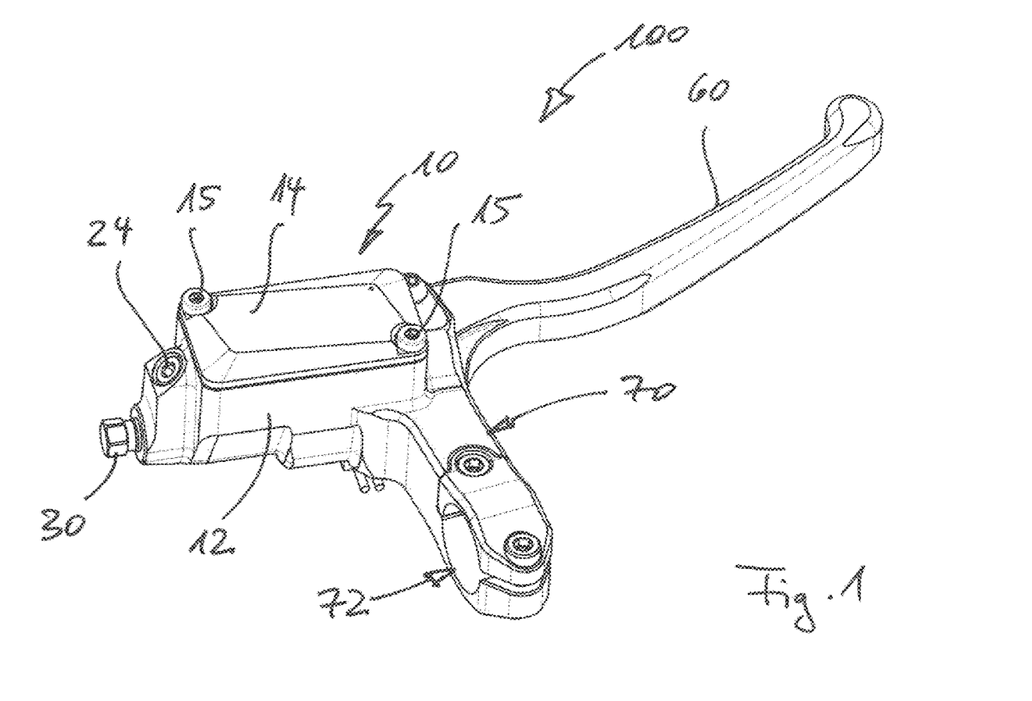
FIG. 1 shows a hydraulic transmitter system with a hydraulic fitting according to the disclosure in a perspective view.
Figure 2:
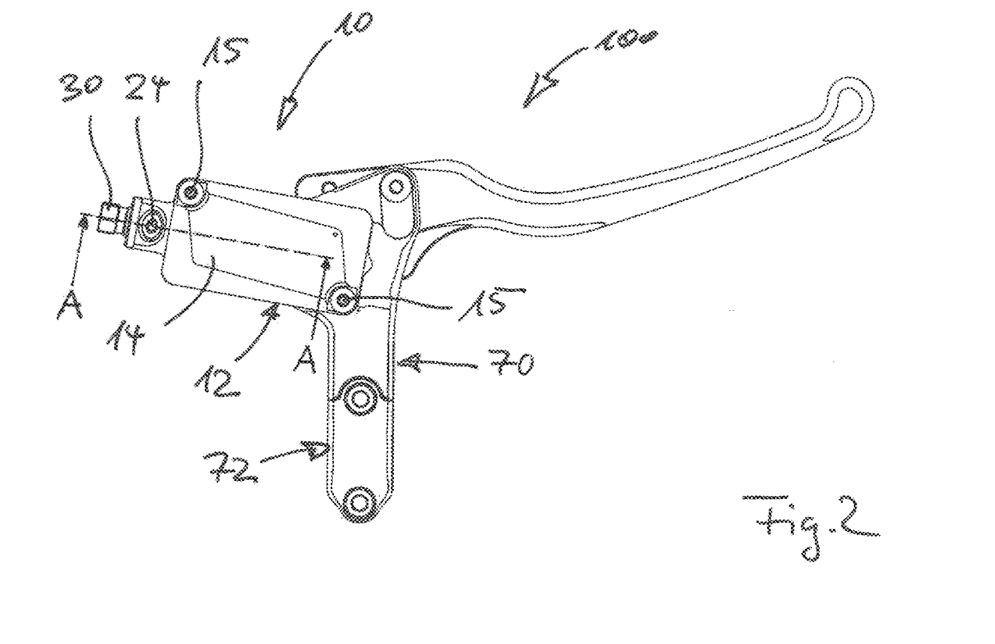
FIG. 2 shows the hydraulic transmitter system of FIG. 1 in plan view.

FIG. 1 shows a hydraulic transmitter system 100 with a hydraulic fitting 10 according to aspects of the disclosure in a perspective view and FIG. 2 shows the hydraulic transmitter system 100 of FIG. 1 in plan view.

The hydraulic fitting 10 comprises a main body which forms a housing 12 and in which the individual elements of the hydraulic brake system according to the disclosure are configured, as is described in more detail below with reference to FIGS. 3 to 5.

Additionally a fastening portion 70 is configured on the main body, a fastening of the hydraulic fitting 10, for example to the handlebars of a bicycle or another handlebar-steered vehicle, being possible thereby. The fastening can be carried out in a manner known per se, as shown in the illustrated exemplary embodiment, for example by means of a clamp arrangement 72.

Moreover, the hydraulic transmitter system 100 comprises an actuating lever 60, such as for example a brake lever, which is articulated to the hydraulic fitting 10, an actuation of the system being able to be carried out thereby as described in more detail hereinafter.

Figure 3:
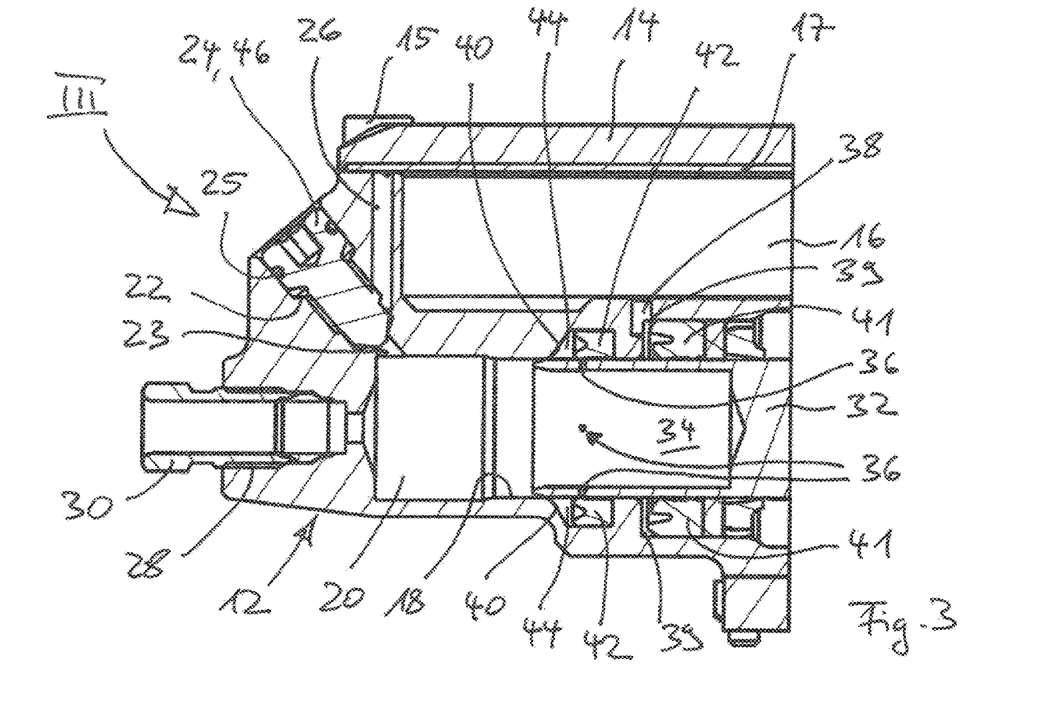
FIG. 3 shows a sectional view of the hydraulic fitting along the cutting line A-A in FIG. 2 in the operating position or closed position.
Figure 4:
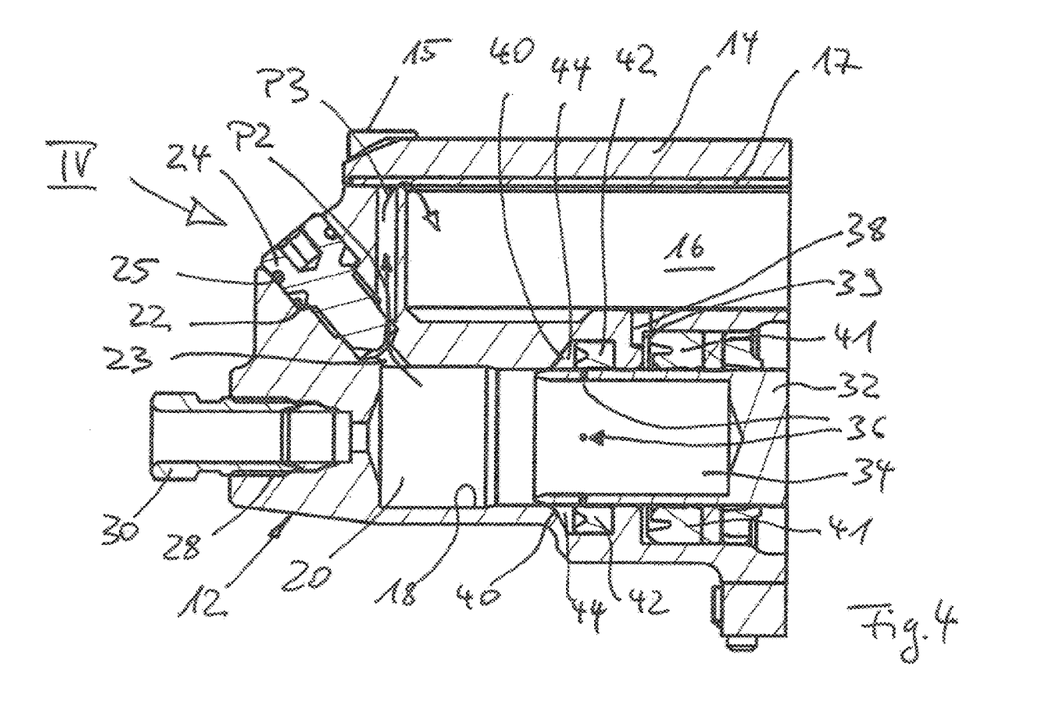
FIG. 4 shows the hydraulic fitting in the sectional view of FIG. 3 in the intermediate position for rapid venting.
Figure 5:
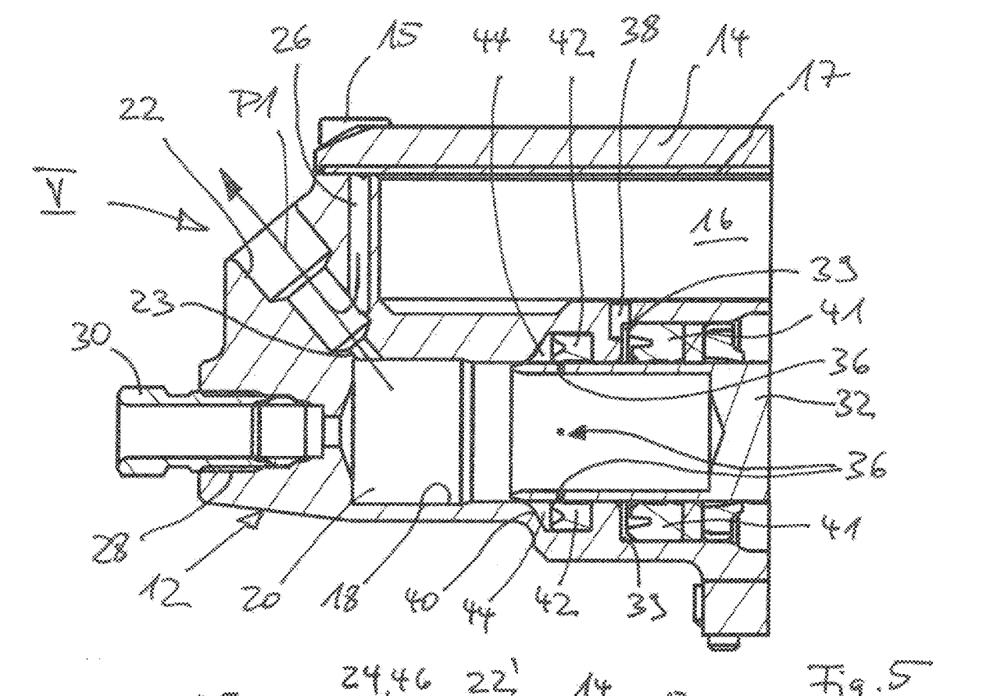
FIG. 5 shows the hydraulic fitting in the sectional view of FIG. 3 in the fully opened venting position.

In particular, a cavity forming a fluid reservoir 16 and a cylinder bore 18 are configured in the housing 12 (see FIGS. 3 to 5). The fluid reservoir 16 is closed relative to a housing surroundings by a cover element 14 which is fastened by means of screws 15 to the housing 12. A membrane 17, which is known per se, is incorporated between the cover element 14 and the fluid reservoir 16 for the purposes of pressure equalization in the hydraulic system.

A piston 32 is axially displaceably arranged in the cylinder bore 18 and operatively connected to the actuating lever 60 in a manner known per se. The cylinder bore 18 defines a cavity 20 which is filled with hydraulic fluid, such as for example brake fluid. The piston 32 has a piston cavity 34 which is open in the direction of the cavity 20. The piston cavity 34 serves in a manner known per se for receiving a restoring spring (not shown in the figures for reasons of clarity) which is supported on a wall 19 of the cylinder bore 18 opposing the piston 32.

At one end of the cylinder bore 18 opposing the piston 32, for example as shown on the wall 19, the cylinder bore 18 feeds into a line connecting bore 28 for connecting the hydraulic fitting 10 to a fluid line (not shown), such as for example a brake line or a clutch line. To this end, as visible from the figures, a line connecting member 30 can be inserted into the line connecting bore 28. The line connecting bore 28, however, can also be configured to feed into the cylinder bore 18 at another suitable point in the housing 12.

A venting bore 22 is also configured in the main body of the housing 12, the venting bore feeding with a feed portion 23 into the pressure chamber 20 of the cylinder bore 18. The venting bore 22 produces a connection between the pressure chamber 20 and the housing surroundings, as illustrated in the open position or venting position V of FIG. 5 by the arrow P1. In the exemplary embodiment shown, the venting bore 22 produces a direct connection between the pressure chamber 20 and the housing surroundings but embodiments with an indirect connection are also possible, as is shown and described hereinafter, for example, in connection with the exemplary embodiments of FIGS. 6 and 9.

During operation, the venting bore 22 is closed by means of a closure member 24 with an O-ring/sealing ring 25 in a manner known per se, as shown in FIG. 3. In this closed position or operating position III, a closed hydraulic system is present. The closure member 24 can be configured, for example, as a screw plug which can be screwed into a correspondingly provided internal thread of the venting bore 22, as in the exemplary embodiment shown. Other design options, such as for example a sealing plug or the like, are readily apparent to a person skilled in the art.

A constituent part of the hydraulic system shown is a fluid connection, which is also known per se, between the cylinder bore 18 (and thus the pressure chamber 20) and the fluid reservoir 16. To this end, for example, a supply bore 38 is provided, the supply bore connecting the fluid reservoir 16 to an annular channel 39 which is configured in the cylinder bore 18. Thus fluid passes from the fluid reservoir 16 into the cylinder bore 18 via the supply bore 38 and the annular channel 39. In the exemplary embodiment shown, the piston 32 is located in the region of the annular channel 39 such that fluid flowing from the supply bore 38 comes into contact with an outer wall of the piston 32 and is introduced between this outer wall of the piston and an inner wall of the cylinder bore 18. Thus the fluid also forms a sliding film for the piston movement. A seal 41 can be inserted into the annular channel 39—as shown.

According to the exemplary embodiment shown, fluid flowing from the fluid reservoir 16 flows via one or more bores 36 distributed over the circumference of the piston 32, so-called snifting bores, into the piston cavity 34 which is open on the pressure chamber side.

An annular groove 40 which receives a further seal 42 can be provided in the cylinder bore 18, as shown, downstream of the flow of re-supplied fluid through the supply bore 38 and the annular channel 39. A remaining cavity adjacent to the further seal 42 forms a circumferential blind hole 44. Other embodiments of the fluid connection are possible between the fluid reservoir 16 and the pressure chamber 20. Thus, for example, as an alternative to the described embodiment with a fixed seal 42 and the snifting bores 36 in the piston 32, a seal which is movable relative to the cylinder bore can be provided on the piston, during the stroke movement the seal passing over one or more supply bores which are provided in the cylinder wall and which connect the pressure chamber to the fluid reservoir (principle of kinematic reversal).

According to aspects of the disclosure, a further temporarily openable fluid connection is provided between the cylinder bore 18 and the fluid reservoir 16. In the exemplary embodiment shown, the fluid connection comprises a connecting passage 26 which connects the fluid reservoir 16 via the venting bore 22 to the pressure chamber 20. To this end, the connecting passage 26 feeds therein slightly above a feed portion 23 which connects the venting bore 22 to the pressure chamber 20 and which represents the end of the venting bore 22 on the pressure chamber side.

As already described above, in the operating position III the venting bore 22 is fully closed for normal operation. As is also shown in FIG. 3, in this operating position III the connection between the connecting passage 26 and the pressure chamber 20 is also interrupted since the closure member (or the screw plug) 24 sealingly protrudes into the feed portion 23. The closure member 24 thus serves at the same time as the closure element 46 for the connecting passage 26.

In the operating position III, a movement of the piston 32 is brought about by actuating the actuating lever 60, whereby a hydraulic pressure is built up, the hydraulic pressure acting in the direction of the hydraulic line (not shown) which is connected via the line connecting member 30. If required (for example with increasing brake pad wear in the case of use in a brake system) fluid can be re-supplied from the fluid reservoir 16 via the fluid connection of the supply bore 38, when the piston 32 during its stroke movement travels back into the resting position with its snifting bores 36 upstream of the further seal 41. In this position, the snifting bores 36 (and thus also the pressure chamber 20) are fluidically connected to the fluid reservoir 16 via the connecting bore 38.

If air should pass undesirably into the closed hydraulic system, the disclosed hydraulic fitting provides the user with the possibility of a simple and uncomplicated "rapid venting". To this end, the closure member 24 is slightly loosened and thus moved into the intermediate position or rapid venting position IV shown in FIG. 4. In this rapid venting position IV the connecting passage 26 feeding into the venting bore 22 is opened up and thus a connection is produced via the feed portion 23 between the venting bore 22 and the pressure chamber 20. If the actuating lever 60 is now (repeatedly) actuated by the user and thus a piston movement is produced, fluid and undesired air contained therein is forced via the feed portion 23 and the connecting bore 26 into the fluid reservoir 16. Undesired air can thus be collected in the fluid reservoir 16. The piston movement can be repeated multiple times until the system is substantially free of air in the pressure chamber 20 (at least free of air to the extent that safe operation can take place). Subsequently the closure member 24 is tightened again and thus moved into the operating position III so that the hydraulic fitting is again ready for use.

The disclosed embodiments of a hydraulic fitting also have the advantage that air, which has collected in an undesirable manner in the above-described blind hole 44 adjacent to the further seal 42, can also be removed by the snifting bores 36 repeatedly passing over the blind hole 44 during the (repeated) reciprocal movement of the piston 32 and can be supplied to the fluid reservoir 16 via the additional fluid connection of the connecting passage 26.

The rapid venting according to aspects of the disclosure does not replace a standard full venting of the hydraulic system and the filling thereof with hydraulic fluid, since the undesired air is "only" "temporarily stored" in the fluid reservoir 16. For standard venting in a manner known per se, the closure member 24 is entirely removed (as shown in FIG. 5) or at least opened such that a connection is produced between the pressure chamber 20 and the housing surroundings (for example closure members with a central continuous bore, which can be opened as required, are known to a person skilled in the art). In the venting position V of the exemplary embodiment shown in FIG. 5, a venting tool with a correspondingly shaped connecting piece can be inserted with an accurate fit into the venting bore 22 and then the fluid reservoir and the pressure chamber are vented at the same time.

FIGS. 6 to 10 show in a highly schematic view further variants of the hydraulic fitting according to the disclosure, wherein elements which are the same or comparable are denoted by the same reference signs. FIGS. 6 to 10 show only a highly schematic detail of the view of FIGS. 3 to 5; naturally the further elements which are not shown, but which have been shown and described in connection with FIGS. 2 to 5, such as in particular the piston 32 and the fluid connection formed by the supply bore 38 and the annular channel 39, are also a constituent part of the variants shown in FIGS. 6 to 10.

Figure 6:
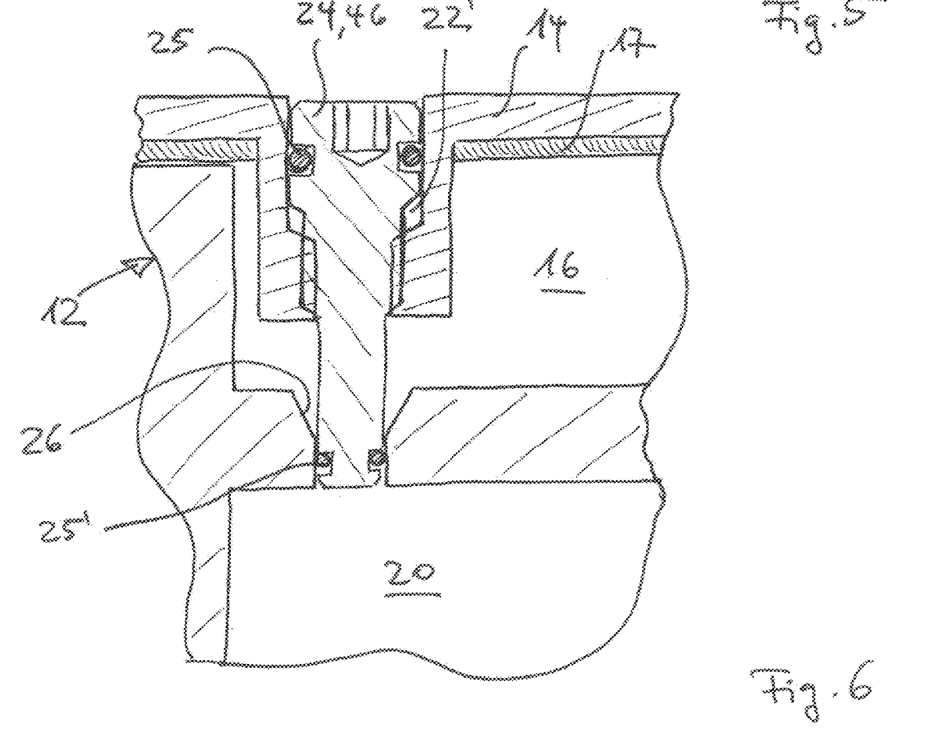
FIG. 6 shows in a highly schematic sketch an embodiment of the disclosed hydraulic fitting with a single closure member for both the venting bore and the connecting passage with a direct connection between the pressure chamber and the fluid reservoir.

FIG. 6 shows an embodiment with a direct connection between the pressure chamber 20 and the fluid reservoir 16, i.e. the connecting passage 26 is directly configured between the fluid reservoir 16 and the pressure chamber 20. In the exemplary embodiment shown of FIG. 6, the venting bore 22' is configured so as to be aligned with the connecting passage 26 in the cover element 14 of the fluid reservoir 16 and thus connects the pressure chamber 20 indirectly via the fluid reservoir 16 to the housing surroundings. The closure member 24 is extended such that it extends through the fluid reservoir 16 into the connecting passage 26 and in the closed position (shown) sealingly closes this connecting passage by means of an O-ring 25' arranged on the closure member 24. The closure member 24 thus also serves at the same time as a closure element 46 for the connecting passage 26.

To produce the intermediate position according to the disclosure, for the purposes of rapid venting the closure member is sufficiently loosened that the fluid connection is opened up between the fluid reservoir 16 and the pressure chamber 20. To produce the venting position, the closure member 24 is entirely removed and the system can be fully vented via the open connection to the pressure chamber 20 via the connecting passage 26.

Figure 7:
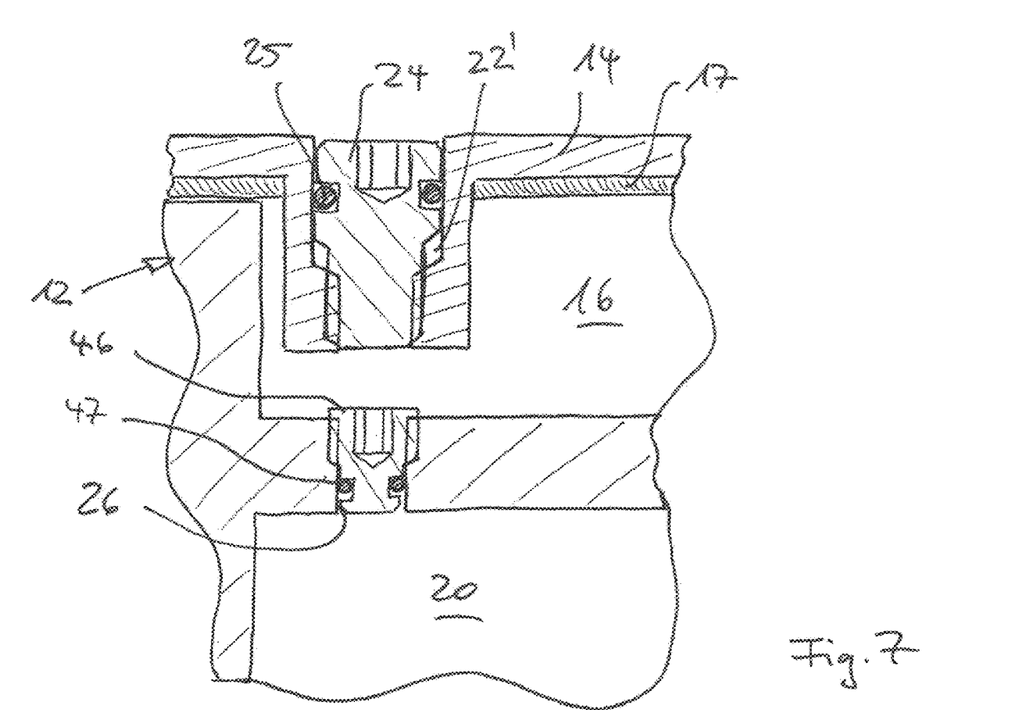
FIG. 7 shows highly schematically a further embodiment of the disclosed hydraulic fitting with a closure member for the venting bore and a closure element for the connecting passage.

FIG. 7 shows a variant which is similar to the basic construction of the exemplary embodiment of FIG. 6, in which the venting bore 22 and the connecting passage 26 are also configured to be aligned with one another. The difference is that the closure member 24 and the closure element 46 are configured separately from one another. In order to be able to undertake a rapid venting according to the disclosure, initially the closure member 24 is entirely removed from the venting bore 22. Subsequently, the closure element 46, which closes the connecting passage 26 by means of an O-ring 47, is sufficiently loosened until a fluid connection is opened up between the fluid reservoir 16 and the pressure chamber 20. Preferably, the venting bore 22 is then closed again before the rapid venting according to the disclosure is carried out by (repeated) actuation of the actuating lever 60. The usual venting can take place with the closure member 24 removed.

Figure 8:
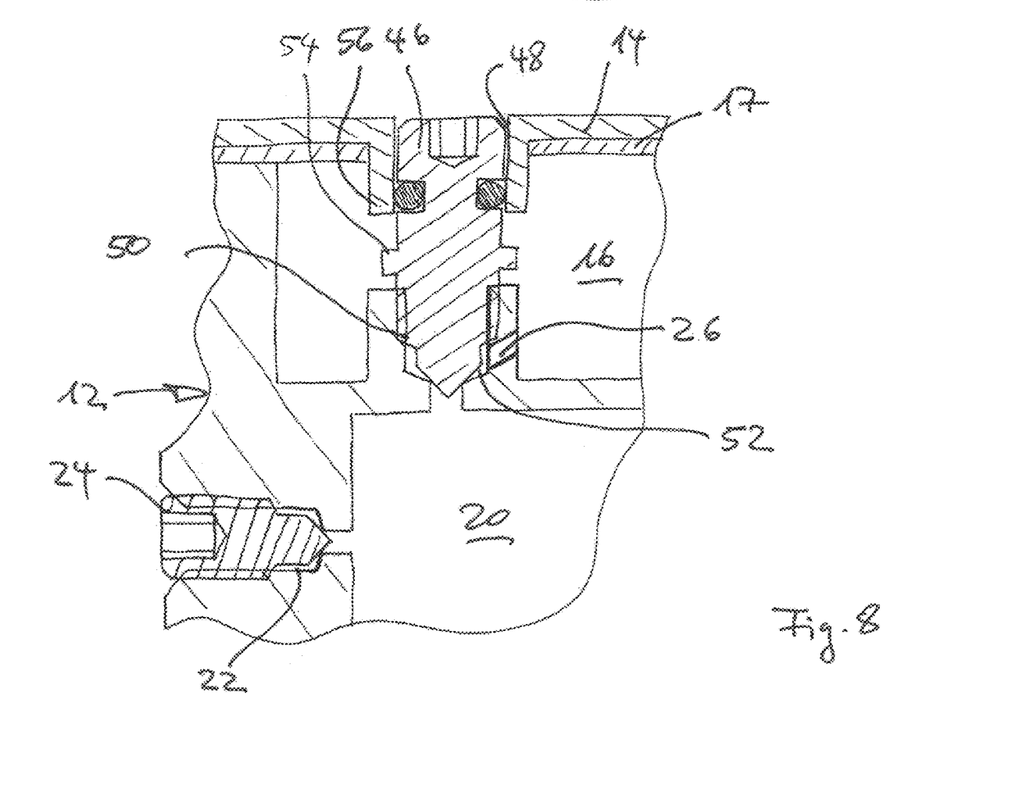
FIG. 8 shows highly schematically a further variant of the disclosed hydraulic fitting with a closure member for the venting bore and a closure element for the connecting passage.

In a similar manner to the embodiment of FIG. 6, FIG. 8 shows an embodiment in which a closure element 46, through an opening 48 provided therefor in the cover element, sealingly engages through the fluid reservoir 16 into a bore 50 which is configured so as to be aligned with the opening 48. Moreover, a venting bore 22, which directly connects the pressure chamber to the housing surroundings independently of the connecting passage, is provided in the housing 12. In the operating position shown, the venting bore 22 is closed by a suitable closure member 24, as known and described. To produce the intermediate position according to the disclosure, for the purposes of rapid venting the closure element 46 is sufficiently loosened (for example until the closure element 46 comes to bear with a protruding stop element 54, which is provided therefor, against a counter stop 56 which is correspondingly configured on the cover element 14) that the fluid connection between the fluid reservoir 16 and the pressure chamber 20 is opened up. To this end, the connecting passage 26—as shown—can feed transversely from the fluid reservoir 16 into a lower region 52 of the aligned bore 50 on the pressure chamber side. Alternatively, the closure element and the bore can also be designed such that the aligned bore undertakes the function of the connecting passage.

To produce the venting position, the closure member 24 is entirely removed and the system can then be fully vented via the open connection to the pressure chamber 20. The connecting passage 26 can be selectively closed or opened for the venting. Venting is possible via the above-described fluid connection, which is present due to the supply bore 38 and the annular channel 39, but is facilitated by an opening of the connecting passage 26 which in this regard also represents an advantage of the disclosed hydraulic fitting.

Figure 9:
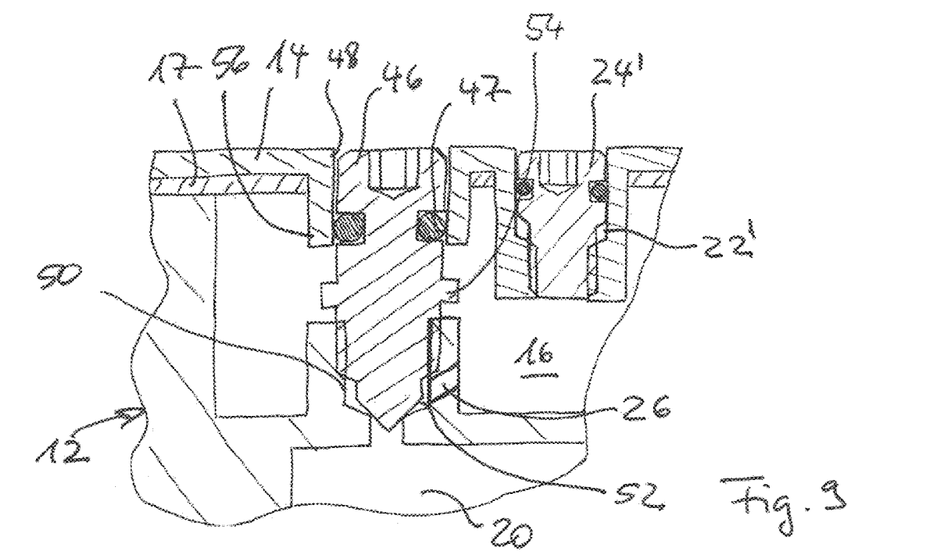
FIG. 9 shows highly schematically yet another variant of the disclosed hydraulic fitting with a closure member for the venting bore and a closure element for the connecting passage.

FIG. 9 shows an embodiment with a connecting passage 26, a closure element 46 and an aligned bore 50, shown and described according to the embodiment of FIG. 8, but with a venting bore 22' incorporated in the cover element 14 and the closure member 24' inserted therein. In this variant, the connection to the housing surroundings is produced via the fluid reservoir 16, thus an indirect connection of the pressure chamber 20 to the housing surroundings. It is also advantageous for the venting, in addition to an unscrewing/removal of the closure member 24', to loosen the closure element 46 in order to open up the connecting passage 26 to the pressure chamber 20.

Figure 10:
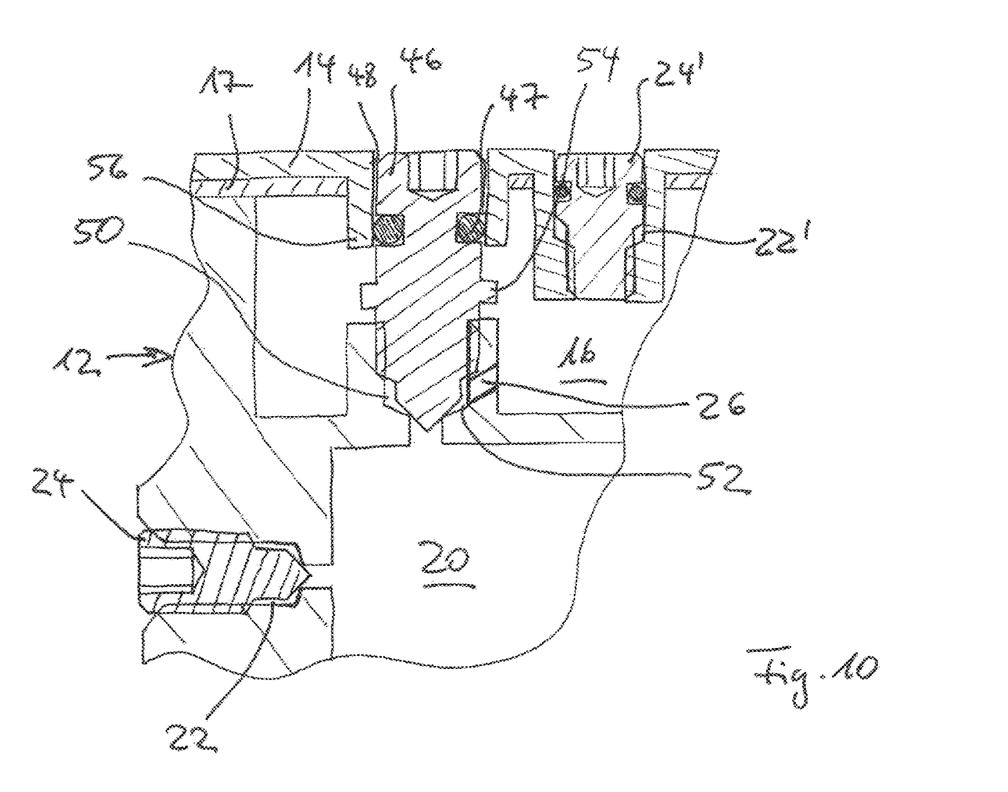
FIG. 10 shows a variant of the disclosed hydraulic fitting with two venting bores and corresponding closure members and a connecting passage with the closure element.

The embodiment of FIG. 10 finally shows a combination of the two variants shown in FIG. 8 or 9. Venting can be carried out here via the venting bore 22 to the pressure chamber 20 and/or the venting bore 22' to the fluid reservoir 16. The venting is facilitated by opening the closure element 46, i.e. opening the connecting passage, to produce the additional fluid connection according to the disclosure.

It should be emphasized once again that the venting bore does not necessarily have to provide a direct connection of the pressure chamber to the housing surroundings but a venting of the system is possible due to the conventionally existing fluid connection and is also facilitated by the additional fluid connection according to the disclosure with a venting bore implementing an indirect connection of the pressure chamber to the housing surroundings.

The disclosed hydraulic fitting can be used in all hydraulic systems in which there is a need for rapid venting according to the disclosure. In particular, the disclosed hydraulic fitting can be used for handlebar-steered vehicles, such as bicycles, motorcycles, and the like, such as for example in open or closed hydraulic brake systems or hydraulic clutch systems. Fields of use other than those described are possible. Design geometries other than those explicitly described are readily apparent to a person skilled in the art within the scope of the inventive principle defined in the claims.

LIST OF REFERENCE SIGNS

10 Hydraulic fitting
12 Housing
14 Cover element
15 Screws
16 Fluid reservoir
17 Membrane
18 Cylinder bore
19 Wall
20 Pressure chamber
22 Venting bore to pressure chamber
22' Venting bore to fluid reservoir
23 Feed portion
24 Closure member, closure screw
24' Closure member, closure screw
25 O-ring
25' O-ring
26 Connecting passage
28 Line connecting bore
30 Line connecting member
32 Piston
34 Piston cavity
36 Bores, snifting bores
38 Supply bore
39 Annular channel
40 Annular groove
41 Seal
42 Further seal
44 Blind hole
46 Closure element
47 O-ring
48 Opening
50 Aligned bore
52 Lower region
54 Stop element
60 Actuating lever, brake lever
70 Fastening portion
72 Clamp arrangement
100 Hydraulic transmitter system
P1 Arrow
P2 Arrow
P3 Arrow
III Closed position or operating position
IV Intermediate position or rapid venting position
V Open position or venting position

The invention claimed is:

1. A hydraulic fitting (10) for a hydraulic transmitter system (100) having a housing (12) in which a fluid reservoir (16), a pressure chamber (20) which is fluidically connected to the fluid reservoir (16) and a venting bore (22, 22') which connects the pressure chamber (20) to a housing surroundings are configured,
wherein the venting bore (22, 22') can be closed during operation and can be opened to produce a venting position (V), said hydraulic fitting (10) also having an additional fluid connection between the fluid reservoir (16) and the pressure chamber (20) which is interrupted during operation,
wherein the additional fluid connection between the fluid reservoir (16) and the pressure chamber (20) is a connecting passage (26) between the fluid reservoir (16) and the pressure chamber (20), said hydraulic fitting (10) comprising a closure element (24, 46) that can be actuated from outside the housing (12) between a closed position (III) interrupting the connecting passage (26) and a rapid venting position ((V) opening the connecting passage (26), and said connecting passage (26) can be temporarily opened by moving the closure member (24, 46) to the rapid venting position (IV) to permit rapid venting while the venting bore (22) remains closed.

2. The hydraulic fitting (10) of claim 1, which has a cylinder bore (18) which surrounds the pressure chamber (20) and in which a piston (32) is displaceably guided.

3. The hydraulic fitting (10) of claim 2, comprising a supply bore (38) connecting the fluid reservoir (16) to an annular channel (39) of the cylinder bore (18).

4. The hydraulic fitting (10) of claim 2, in which one or more bores (36) are provided in the piston (32), the bores being distributed over a circumference of the piston (32) and feeding into a piston cavity (34) which is open on the pressure chamber (20) side.

5. The hydraulic fitting (10) of claim 1, comprising a closure member (24, 24') to be inserted into the venting bore (22, 22') closes the venting bore (22, 22') during operation and can be removed or opened to produce the venting position (V), wherein the closure member (24, 24') is a screw plug.

6. The hydraulic fitting (10) of claim 1, wherein the connecting passage (26) thereof directly connecting the fluid reservoir (16) and the pressure chamber (20).

7. The hydraulic fitting (10) of claim 1, in which the closure element (46) is the closure member (24) of the venting bore (22).

8. The hydraulic fitting (10) of claim 1, wherein the connecting passage (26) thereof connecting the fluid reservoir (16) and the pressure chamber (20) via the venting bore (22) such that in the closed position (III) of the closure member (24) no connection is present between the connecting passage (26) and the pressure chamber (20) and in that, in an intermediate position of the closure member (24) to permit the rapid venting, the additional fluid connection between the fluid reservoir (16) and the pressure chamber (20) via the connecting passage (26) and the venting bore (22) is opened up without being connected to the housing surroundings.

9. A hydraulic transmitter system (100) comprising a hydraulic fitting (10) of claim 1 and an actuating lever (60) operatively connected to the hydraulic fitting (10).

10. A hydraulic fitting (10) for a hydraulic transmitter system (100), said hydraulic fitting comprising:
- a housing (12) defining:
  - a fluid reservoir (16);
  - a pressure chamber (20) fluidically connected to the fluid reservoir (16);
  - a venting bore (22, 22') which connects the pressure chamber (20) to a housing surroundings; and
  - an additional fluid connection between the fluid reservoir (16) and the pressure chamber (20); and
- a closure element (24, 46) that can be actuated from outside the housing (12) between a closed position (III) interrupting the additional fluid connection and a rapid venting position ((V) opening the additional fluid connection,
- wherein the additional fluid connection can be temporarily opened by moving the closure member (24, 46) to the rapid venting position (IV) to permit rapid venting while the venting bore (22) remains closed.

* * * * *